Patented May 25, 1926.

1,585,826

UNITED STATES PATENT OFFICE.

ANSON G. BETTS, OF KINDERHOOK, NEW YORK.

CERAMIC AND REFRACTORY MAKING PROCESS AND MATERIAL.

No Drawing.   Application filed March 3, 1923. Serial No. 622,678.

This invention relates to the simultaneous or connected bonding, and purification from deleterious constituents, of refractory and ceramic materials, and obtaining an improved and purer product from any given suitable raw material.

The object of this invention is to enable the utilization of more impure clays and other refractory and ceramic constituents and to produce superior products. Other objects will appear herein.

It is well-known that refractory raw material, such as clay has to be of high purity, with regard to iron probably especially and that there are far more abundant clays which are not suitable for the production of high-grade products, and it is also known that the clays of really high purity and freedom from fluxing ingredients are either very scarce or do not exist in commercial quantities. It is also known that many china clays are rendered of inferior grade by the presence of too much iron, and are consequently to a large extent ruled out for the making of white ware.

I overcome the foreging difficulties by volatilizing impurities especially iron, as chlorides, during the burning processes. I prefer to do this by forming the articles, brick, for example, from a suitable mixture of raw clay and other ingredients, using instead of water, solution of aluminum chloride, and especially prefer a basic solution of aluminum chloride. The method may be applied as well, when no clay is used, but any refractory grain, except basic material like magnesite, can be used instead of clay, raw, or burnt.

The article so formed may be partly burned, green, if suitable means be applied to make it hold shape during the first heating, for example, by remaining enclosed in the mold. If it is desired that the article shall dry before forming, it is suitable to incorporate in the mix powdered metallic aluminum, aluminum hydrate, or other material to cause basic aluminum chlorides to form, which will dry, while aluminum chloride itself resists drying.

On burning, or heating, hydrochloric acid tends to escape leaving probably more basic aluminum-chlorine-water compounds which decompose somewhat slowly and seem to require a bright red heat to eliminate the chlorine as hydrochloric acid. The hydrochloric acid given off probably forms chlorides with the deleterious materials, which are more or less volatile, especially ferric chloride. Possibly the aluminum basic chlorides transfer the chlorine by chemical reaction to the said impurities, without the intermediate formation of hydrochloric acid. The result obtained is the formation of ferric chloride and the partial or complete elimination of iron from the body, according to the conditions, and relative amounts of the various ingredients present.

I prefer to maintain the gaseous atmosphere in which the heating takes place, with reference to the chemical condition of the iron. An atmosphere containing hydrogen, or a reducing flame, tends to reduce ferric chloride to ferrous chloride which is less volatile, and an excess of oxygen or a strong air blast prevents the result to a considerable degree or completely depending on the relative volumes and other factors. If small bodies are heated in excess of oxygen, there is little useful result chlorine probably being formed instead of hydrochloric acid. The best conditions are obtained when the bodies are enclosed in molds, saggars, etc., if the iron is present in the ferric state, or conditions obtain capable of converting ferrous to ferric iron.

Other chlorides may be used instead of aluminum chloride, which have the property of generating hydrochloric acid when highly heated, as zinc chloride, but magnesium or calcium chlorides are excluded, as they are not desirable ingredients to introduce in the type of refractories to which my process is highly advantageous, such as silica, silicates, alumina.

The use of aluminum chloride solution in the wet molding of refractories and ceramics increases the density of the resulting product, as well as refractoriness. By the herein method, the chlorine is made to do exceedingly useful work, when driven off, by forming volatile chlorides of deleterious ingredients, especially of iron.

If neutral aluminum chloride is used the part of the hydrochloric acid is driven off at a low temperature, and is possibly less effective than if generated at a red heat, and as the proportion of the chlorine contained in basic aluminum chloride, which is evolved at high temperatures, is greater than the corresponding proportion in neutral aluminum chloride solution, AlCl₃, the chlorine is considered to be applied more effectively as a basic chloride.

Having shown a method of eliminating iron from a refractory product, it is seen that the aluminum chloride solution used need not be itself free from iron and may in consequence be cheaply made by dissolving common suitable aluminous materials containing some iron, in hydrochloric acid, and thus more cheaply supplied than aluminum chloride solution made by the present chemical methods.

The aluminum chloride may be substituted by hydrochloric acid, producing ferric chloride or ferrous chloride later converted by oxidation to ferric chloride, and aluminum chloride from aluminous constituents, and on heating obtain a similar result, but it is preferred to convert the hydrochloric acid to aluminum chloride, as it is easier handled, and less destructive to molds machinery, etc.

I may increase the low temperature strength of the bond of alumina, derived from the aluminum chloride, by using in connection therewith solution of some aluminum fluoride, or of one of the fluoride-chlorides as $AlF_2Cl$, or $AlFCl_2$, but the volatilization is effected most economically by the chlorine, rather than the fluorine. The use of zinc chloride in connection with aluminum chloride increases the strength of the low temperature bond and possibly helps in holding back chlorine to be evolved at the higher heats when chemical reaction is more active, on the iron and other deleterious oxides.

I apply my process to the bonding and purification of a considerable class of ceramic and refractory raw material, including a large series of materials of the alumina-silica series including the end materials alumina and silica, zircon, zirconia crude or purified, carborundum and others. All of these materials have the common property of being insoluble in acids, and are not subject to attack by hydrochloric acid vapors, it being known that the chlorides of alumina and silica do not result from the action of hydrochloric acid vapors on the oxides, separately or combined or mixed together. I do not apply my process to the bonding and purification of basic refractory materials, of which magnesia is the outstanding example. It is well known that magnesia is basic and will decompose a salt like aluminum chloride, in the wet way, on mixing, producing aluminum hydroxide and magnesium chloride in solution, so that in such a case, on drying, any bonding effected would be of a different sort than that obtained by the dehydration of aluminum chloride. Further, in the presence of an excess of magnesium oxide as in the example of a magnesia brick, it is obvious that any vapors of hydrochloric acid would merely produce basic magnesium chloride and no ferric chloride and hence no volatilization of ferric chloride can result. My invention is therefore limited to the bonding and purification from iron, of acid-insoluble materials, and such materials, due to such property of acid insolubility do not decompose the aluminum salt when mixed in, for forming the article and do not prevent the action which I obtain, in eliminating iron on heating the article.

What I claim as new and desire to secure by Letters Patent, is—

1. Process of bonding and purifying an iron-containing acid-insoluble refractory base, which consists in mixing therewith and thereafter heating therewith hydrated basic aluminum chloride, and volatilizing iron chloride therefrom.

2. Process of bonding iron-containing acid insoluble refractory material and of purifying the same, which consists in mixing with an aluminum chloride in the presence of water, and heating, developing an aluminous bond and volatilizing iron chloride from the mass.

3. Process of bonding and purifying comminuted ferruginous acid-insoluble refractory material which consists in forming the same with hydrated aluminum chloride as vehicle, heating in a neutral atmosphere, developing a bond of alumina and volatilizing iron chloride from the mass.

4. Process of bonding and purifying comminuted iron-containing acid insoluble refractory material which consists in forming to shape with aluminum chloride and water as vehicle, heating in a protected atmosphere, developing a bond of alumina and volatilizing a chloride of iron from the shape.

In testimony whereof I have hereunto signed my name.

ANSON G. BETTS.